(12) United States Patent
Aloni et al.

(10) Patent No.: US 8,719,559 B2
(45) Date of Patent: *May 6, 2014

(54) MEMORY TAGGING AND PRESERVATION DURING A HOT UPGRADE

(75) Inventors: Dan Aloni, Rishon Le-Zion (IL); Maor Ben-Dayan, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 845 days.

This patent is subject to a terminal disclaimer.

(21) Appl. No.: 12/903,826

(22) Filed: Oct. 13, 2010

(65) Prior Publication Data

US 2012/0096251 A1 Apr. 19, 2012

(51) Int. Cl.
*G06F 9/24* (2006.01)
(52) U.S. Cl.
USPC ............................................... 713/2; 717/168
(58) Field of Classification Search
USPC ............................................... 713/2; 717/168
See application file for complete search history.

(56) References Cited

U.S. PATENT DOCUMENTS

| 7,409,537 | B2 | 8/2008 | Tsang |
| 8,239,667 | B2 * | 8/2012 | Durham ........................ 713/100 |
| 2003/0005223 | A1 | 1/2003 | Coulson et al. |
| 2007/0028082 | A1 | 2/2007 | Lien |
| 2007/0083746 | A1 | 4/2007 | Fallon et al. |
| 2009/0031166 | A1 | 1/2009 | Kathail et al. |
| 2009/0217021 | A1 | 8/2009 | Goodson et al. |
| 2010/0017591 | A1 | 1/2010 | Smith et al. |

OTHER PUBLICATIONS

Michael M. Swift et al., "Recovering Device Drivers", URL: http://nooks.cs.washington.edu/recovering-drivers.pdf, 2004, 15 pages.

* cited by examiner

*Primary Examiner* — Albert Wang
(74) *Attorney, Agent, or Firm* — Griffiths & Seaton PLLC (57) ABSTRACT

A processor, executing a first operating system kernel, tags a region of volatile memory coupled to the processor, and initiates a boot of a second operating system kernel while preserving in the volatile memory contents stored therein. Following the boot of the second operating system kernel, a set of parameters referencing the tagged region is retrieved from the volatile memory, and the tagged region is then used, based on the retrieved set of parameters.

14 Claims, 4 Drawing Sheets

FIG. 1B

FIG. 2

MEMORY TAGGING AND PRESERVATION DURING A HOT UPGRADE

CROSS-REFERENCE TO RELATED APPLICATIONS

This application is related to U.S. Patent Applications entitled "Preparing and Preserving a System Configuration During a Hot Upgrade" and "Port Throttling Across an Operating System Restart During a Hot Upgrade" filed on even date with the present application, and which are incorporated herein by reference.

FIELD OF THE INVENTION

The present invention relates generally to a software upgrade for a computer appliance, and specifically to tagging and preserving volatile memory regions across operating system restarts during a hot upgrade.

BACKGROUND OF THE INVENTION

Operating systems manage the way software applications utilize the hardware of computer systems, such as storage controllers. A fundamental component of operating systems is the operating system kernel (also referred to herein as a "kernel"), which provides secure computer system hardware access to software applications executing on the computer system. Since accessing the hardware can be complex, kernels may implement a set of hardware abstractions to provide a clean and uniform interface to the underlying hardware. The abstractions provided by the kernel provide software developers easier access to the hardware when writing software applications.

Two common techniques for rebooting (i.e. restarting) an operating system are a "cold boot" and a "warm boot". During a cold boot, power to a computer system's volatile memory is cycled (i.e., turned off and then turned on), and the operating system is rebooted. Since power is cut off to the memory, any contents (i.e., software applications and data) stored in the memory prior to the cold boot are lost. During a warm boot, the operating system reboots while power is still applied to the volatile memory, thereby preserving the contents stored in the volatile memory.

In addition to a warm boot and a cold boot, the Linux operating system offers a method of rapidly booting a new operating system kernel via the kexec function. The kexec function first loads a new kernel into memory and then immediately starts executing the new kernel.

SUMMARY OF THE INVENTION

An embodiment of the present invention provides a method, including tagging, by a processor executing a first operating system kernel, a region of a volatile memory coupled to the processor, initiating a boot of a second operating system kernel while preserving in the volatile memory contents stored therein, retrieving, following the boot of the second operating system kernel, a set of parameters referencing the tagged region from the volatile memory, and using the tagged region, based on the retrieved set of parameters.

There is also provided, in accordance with an embodiment of the present invention, an apparatus, including a volatile memory, and a processor configured to execute a first operating system kernel and tag a region of a volatile memory coupled to the processor, to retrieve, following the boot of the second operating system kernel a set of parameters referencing the tagged region from the volatile memory, and to use the tagged region based on the retrieved set of parameters.

There is further provided, in accordance with an embodiment of the present invention, a computer program product including a non-transitory computer readable storage medium having computer readable program code embodied therewith, the computer readable program code including computer readable program code configured to tag the planned system configuration, computer readable program code configured to tag a region of a volatile memory coupled to the processor, computer readable program code configured to initiate a boot of a second operating system kernel while preserving in the volatile memory contents stored therein, computer readable program code configured to retrieve, following the boot of the second operating system kernel, a set of parameters referencing the tagged region from the volatile memory, and computer readable program code configured to use the tagged region, based on the retrieved set of parameters.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

There may be instances when an administrator (i.e., an individual) needs to upgrade computer programs executing on a computer appliance, such as a storage controller. Examples of computer programs executing on the storage controller include an operating system kernel (of an operating system such as Linux), and a storage system application. The storage system application manages storage controller operations such as storage volume maintenance, thin provisioning and data replication (e.g., mirroring). The storage system application runs "on top" of the operating system kernel in the sense that kernel provides a set of services and libraries for the storage system application to interact with the kernel, the storage controller hardware components (e.g., volatile memory and disk drives), as well as any other computer programs executing on the storage controller.

Given the variety of software executing on a storage controller, it may be sometimes preferable to perform a hot upgrade (i.e., upgrading computer programs executing on the storage controller while the storage controller is in operation) for multiple software applications simultaneously (e.g., upgrading the operating system kernel at the same time as upgrading the storage system application). Embodiments of the present invention provide methods and systems for tagging and preserving storage controller memory regions, thereby providing shared memory services which are persistent during a hot upgrade. Preserving the identified memory regions enables the storage controller operator to upgrade software applications without interruption to in-flight I/O operations. Examples of memory regions that can be preserved using embodiments of the present invention include caches, system configuration information, and memory regions used for direct memory access (DMA) transfers from a device adapter (a module coupling the storage controller to a storage device, such as a disk drive) or a network interface controller (a module enabling the storage controller to communicate with other devices and computers over a network).

In some embodiments, sets of parameters defining the tagged memory regions are stored to a parameter table in the storage controller's volatile memory, while executing a first storage system application running on top of a first operating system kernel. After booting a second operating system kernel, the second kernel executes second storage system application which loads the sets of parameters from the parameter table and establishes addressability to the tagged memory regions. Once addressability is established to the tagged memory regions, the second storage system application can address the contents of the tagged memory regions as they were prior to loading the second kernel, and the storage controller can then proceed to process new I/O requests.

System Description

Figures 1, 1A:
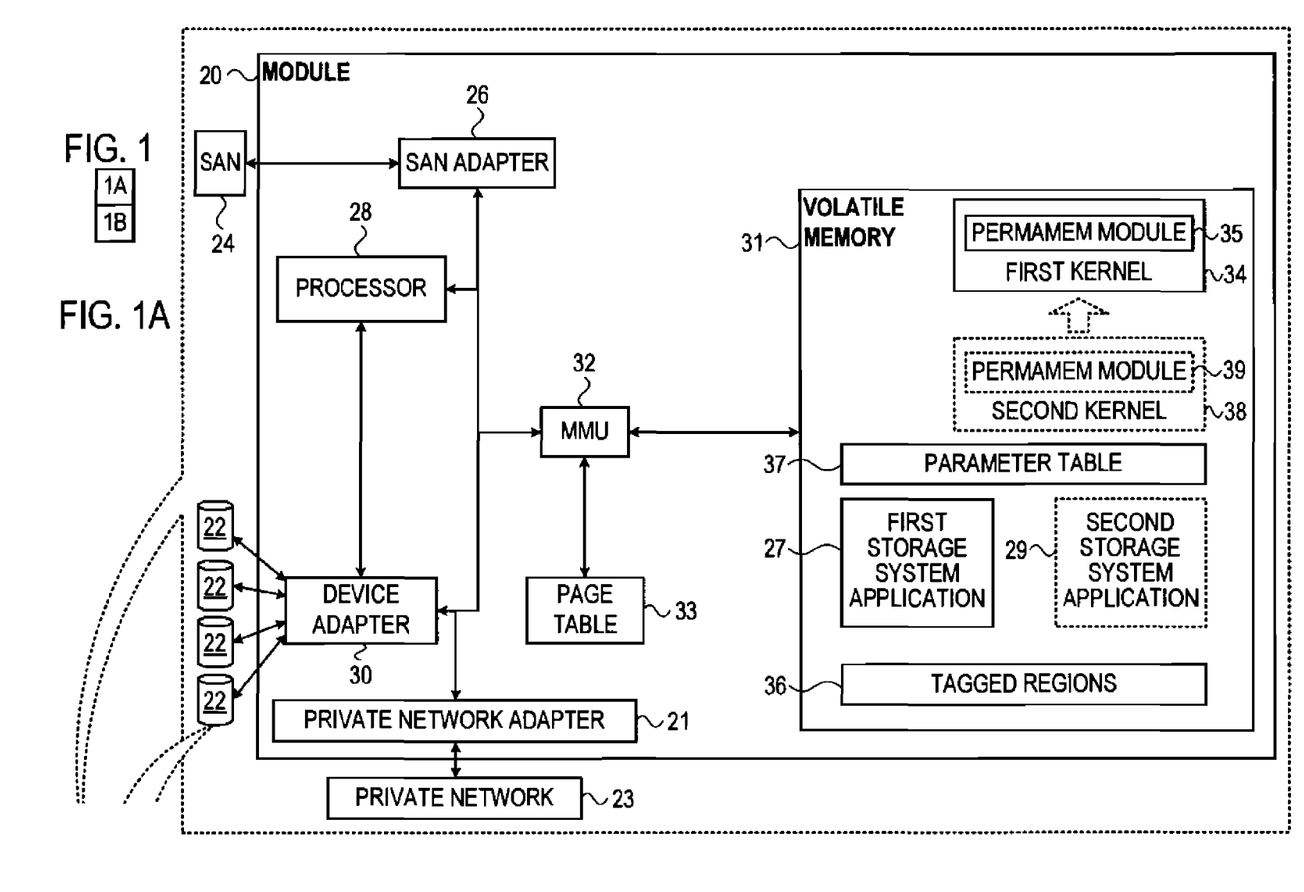
FIGS. 1A and 1B, referred to collectively as FIG. 1, are a schematic pictorial illustration of a storage controller implementing memory tagging and preservation, in accordance with an embodiment of the present invention.
Figure 1B:
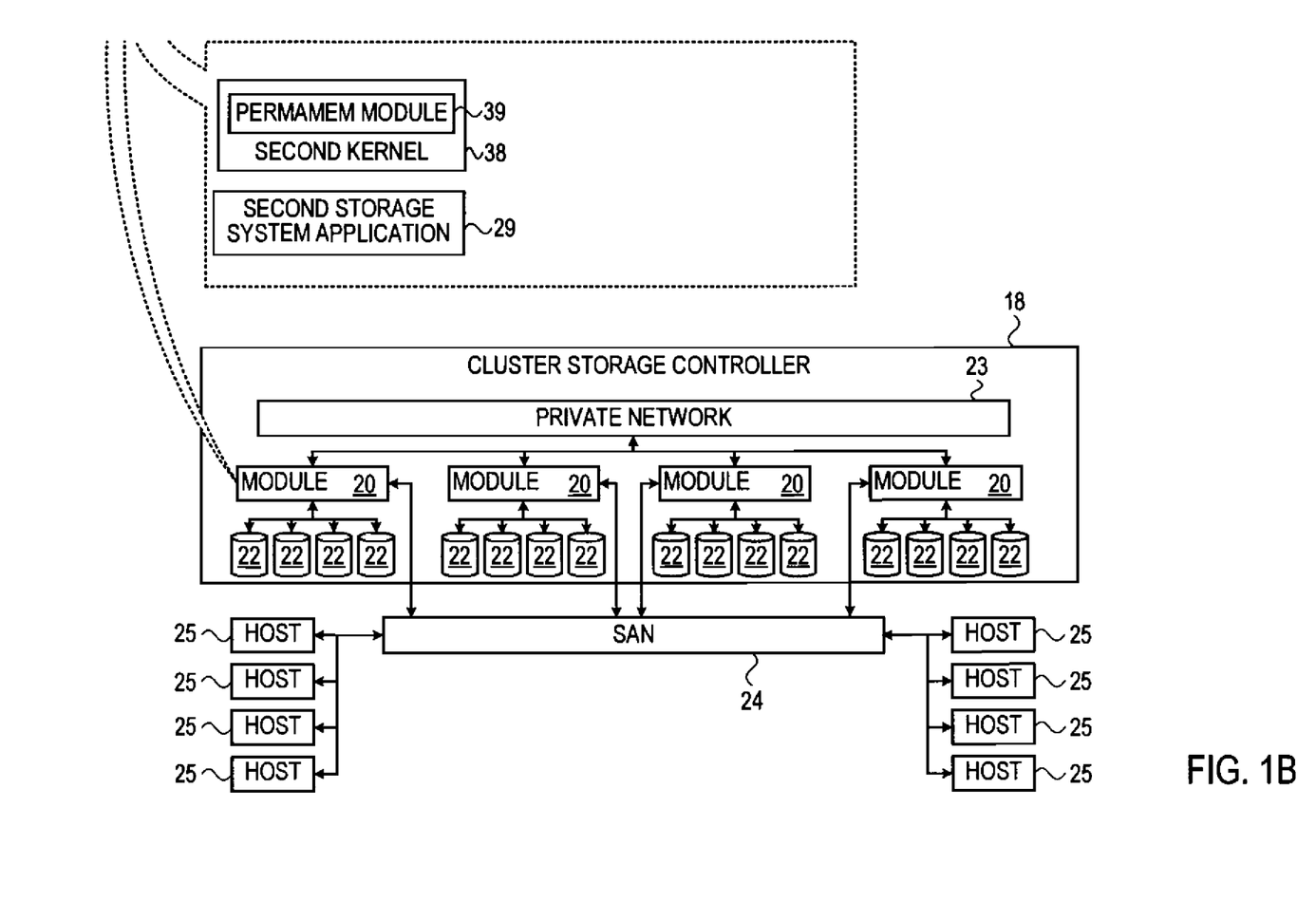

FIG. 1 is a schematic pictorial illustration of a clustered storage controller 18, operative to perform memory preservation and tagging, in accordance with an embodiment of the present invention. In the implementation shown in the figures, clustered controller 18 comprises a plurality of generally similar modules 20. For simplicity, only one such module is shown in the figures. Modules 20 processes I/O requests (i.e., commands to read or write data at logical addresses on logical volumes) from one or more host computers 25 coupled to a storage area network (SAN) 24. Examples of SAN adapters include Fibre Channel (FC) adapters and Internet Small Computer System Interface (iSCSI) adapters. Each module 20 manages a number of storage devices 22, and is coupled to SAN 24 via a hardware SAN adapter 26. Within clustered storage controller 18, each module 20 is also coupled to a private network 23 via a private network adapter 21. Private network 23 enables modules 20 in clustered storage controller 18 to communicate with one another.

While the description herein relates generally to a clustered storage controller, it will be understood that embodiments of the present invention may also be used for a non-clustered storage controller, and those having ordinary skill in the art will be able to adapt the description, mutatis mutandis, to apply to a non-clustered storage controller.

A processor 28 processes the I/O requests, transfers data from/to storage devices 22 (e.g., a hard disk or a solid state drive) via a device adapter 30, and conveys the results of the I/O requests (e.g., an acknowledgement of the write operation, or the retrieved data of the read operation) to host computer 25 on SAN 24 via SAN adapter 26. Examples of device adapters include International Business Machines (IBM) ServeRAID™ M5000 series adapters, which implement both Serial Advance Technology Attachment (SATA) and Serial Attached SCSI (SAS) computer bus interfaces. Storage devices 22 typically comprise a combination of high capacity hard disk drives and solid state disk drives.

Processor 28 typically comprises a general-purpose computer configured to carry out the functions described herein. The software may be downloaded to a volatile memory 31 in electronic form, over a network, for example, or it may be provided on non-transitory tangible media, such as optical, magnetic or electronic memory media. Alternatively, some or all of the functions of processor 28 may be carried out by dedicated or programmable digital hardware components, or by using a combination of hardware and software elements.

SAN adapter 26, processor 28 and device adapter 30 access volatile memory 31 via a memory management unit (MMU) 32, which performs virtual memory management by translating virtual addresses (i.e., referenced by the SAN adapter, the processor and the device adapter) to their corresponding physical addresses (i.e., in volatile memory 31). The mapping relationship between the physical addresses and the virtual addresses is stored in a page table 33. In addition to mapping virtual addresses to their corresponding physical addresses, page table 33 enables MMU 32 to present a combination of non-contiguous regions in volatile memory 31 as a single contiguous virtual memory region.

Initially, processor 28 executes a first storage system application 27 running on top of a first operating system kernel 34 stored in a particular address in volatile memory 31. First operating system kernel 34 comprises a permamem module 35 (a software module) configured to enable first storage system application 27 to identify a set of parameters referencing each of tagged regions 36, and to store the sets of parameters to a parameter table 37 stored in memory 31.

Memory 31 also stores a second operating system kernel 38. Prior to booting second operating system kernel 38, processor 28 overwrites first operating system kernel 34 with the second kernel, so that the second kernel is now stored at the particular address in memory 31 which previously stored the first kernel. Second operating system kernel 38 comprises a permamem module 39 configured to enable a second storage system application 29 (which is started by the second kernel) to retrieve the sets of parameters stored in parameter table 37 and to use the tagged regions referenced by the sets of parameters. Permamem modules 35, 39 and parameter table 37 are described in further detail hereinbelow.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Memory Tagging and Preservation

Figure 2:
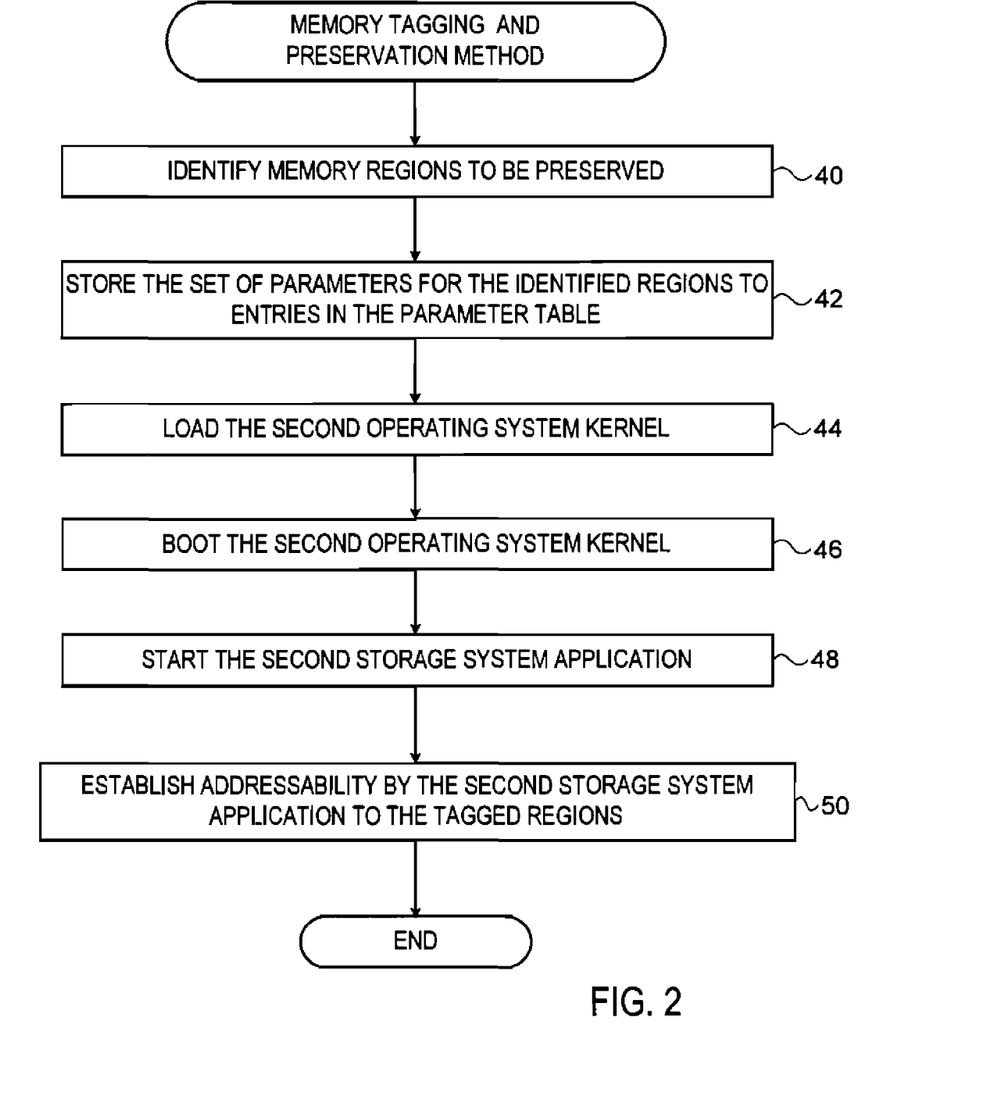
FIG. 2 is a flow diagram that schematically illustrates a memory tagging and preservation method, in accordance with an embodiment of the present invention.

FIG. 2 is a flow diagram that schematically illustrates a memory tagging and preservation method during a hot upgrade, in accordance with an embodiment of the present invention. In first tagging step 40, processor 28, executing first storage system application 27 on top of first operating system kernel 34, identifies regions 36 in virtual memory used by the first storage system application to be tagged and preserved. As discussed supra, examples of data stored in tagged regions 36 include a cache for storage device 22, configuration information for first storage system application 27 and regions for DMA transfers to/from device adapter 30 and SAN adapter 26. Additionally or alternatively tagged regions 36 may include regions in memory 31 allocated for transaction states, and memory mappings such as memory mapped files and memory mapped I/O.

When tagging regions 36, processor 28 first identifies virtual memory addresses for the tagged regions, and then (via MMU 32 and page table 33) identifies physical memory addresses in memory 31 associated with the tagged virtual memory regions.

After obtaining the physical memory addresses for the tagged regions from MMU 32, processor 28, in a second tagging step 42, identifies and stores a set of parameters for each of the tagged regions to respective entries of parameter table 37. Each set of parameters references one of the tagged regions and comprises elements which can include information for each of the tagged regions such as (a) a name identifying the region, (b) size (i.e., the number of bytes), (c) virtual memory address, (d) physical memory address, and (e) memory type, indicating whether the tagged memory region is restricted to a kernel space comprising memory regions reserved for kernel 34 and kernel 38 or a user space (i.e., memory regions used by user applications). Since each of tagged regions 36 may include more than one physical memory region, the set of parameters stored in parameter table 37 may include sets of parameters for "anchors", which are multiple physical memory regions that comprise the contiguous virtual memory region (i.e., one of tagged regions 36).

In a kernel load step 44, processor 28 loads second operating system kernel 38 to volatile memory 31. In a kernel boot step 46, processor 28 calls the kexec function, which first overwrites kernel 34 with kernel 38 (i.e., in the volatile memory), and then starts executing the second operating system kernel. Alternatively, if the start is via a warm boot, then in step 44, processor 28 stores second operating system kernel 38 to a boot partition of storage device 22, and then in step 46, processor 28 initiates a warm boot to start the second operating system kernel. Since power is applied to volatile memory 31 while starting the second operating system kernel (i.e., via either the execution of the kexec function or the warm boot), contents stored in the volatile memory are preserved during the transition from first kernel 34 to second kernel 38.

Following execution of second kernel 38, in an application start step 48, processor 28 loads second storage system application 29 from storage device 22 to memory 31, and starts executing the second storage system application. While the configuration of storage devices 22 shown in FIG. 1 shows the one of the storage devices 22 storing second kernel 38 and second storage system application (i.e., the computer programs and the configuration used by storage controller 18 after the hot upgrade), the storage devices typically store many computer programs and data files used by the modules of the storage controller.

Finally, in an establish addressability step 50, second storage system application 29 establishes addressability to tagged regions 36. To establish addressability, second storage system application 29 determines that it was started after a hot upgrade, and then retrieves, via functions in permamem module 39, the sets of parameters associated with tagged regions 36 from parameter table 37. Second storage system application 29 can then access and update tagged regions 36 (e.g., a cache or a system configuration).

To retrieve the sets of parameters, the second storage system application calls one or more functions in permamem module 39. For example, a function tagmem_reg_get_by_name (discussed in further detail hereinbelow) returns a pointer to the region in memory 31 associated with a name (e.g., "cache") which is passed to the function as a parameter. Processor 28 can then call Linux kernel function reserve_bootmem, to reserve an address range in virtual memory (i.e., in volatile memory 31) referenced by the retrieved parameters Upon completing the process of the flow diagram, second storage system application 29 can address and use the tagged memory regions as they were used by first storage system application 27 prior to step 44.

During the hot upgrade described in the flow diagram, tagging steps 40 and 42 "tag" the memory regions to be preserved across booting second operating system kernel 38. Upon completing the tagging steps, clustered storage controller 18 can operate for an unspecified period of time (e.g., a day, a month, or even several years) with the memory regions tagged, until the storage system administrator (not shown) starts the computer program upgrade process described in steps 44-50 of the flow diagram shown in FIG. 2.

Figure 3:
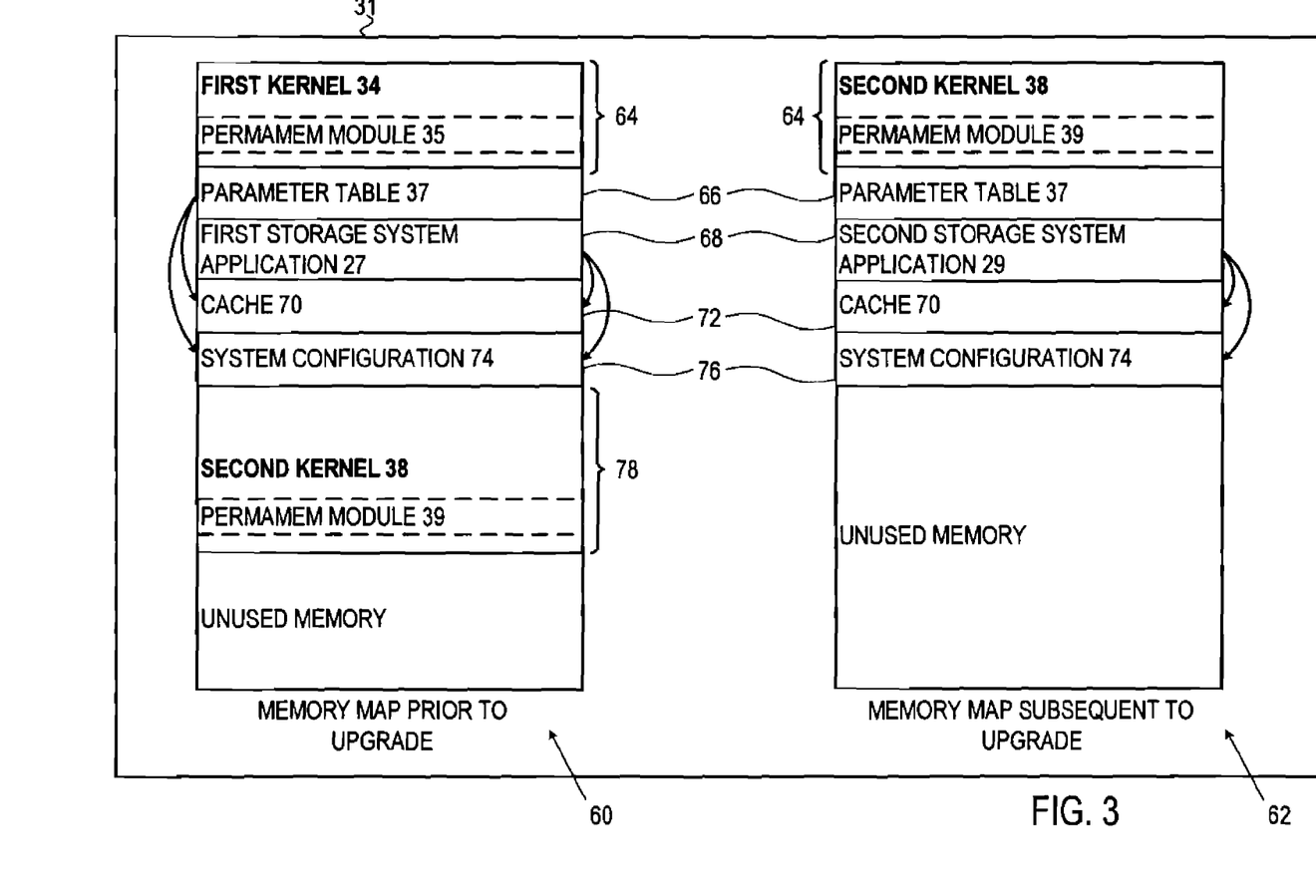
FIG. 3 is a block diagram that schematically illustrates memory maps of a volatile memory of a storage controller implementing memory tagging and preservation, in accordance with an embodiment of the present invention.

FIG. 3 is a block diagram that schematically illustrates a memory map 60 of volatile memory 31 prior to step 44 of the flow diagram of FIG. 2, and a memory map 62 of the volatile memory upon completing the process of the flow diagram. Prior to step 44, first kernel 34, including permamem module 35, is stored in a memory region 64. Permamem module 35 comprises functions (described in further detail hereinbelow) managing parameter table 37, which is stored in a memory region 66. In addition to first kernel 34, processor 28 is also executing (i.e., prior to step 44) first storage system application 27, which is stored in a memory region 68. In operation, first storage system application 27 accesses both a cache 70 which is stored in a memory region 72, and a system configuration 74, which is stored in a memory region 76.

In the example shown in FIG. 3, tagged regions 36 comprises memory regions 72 and 76. Subsequent to step 50, entries in parameter table 37 comprise pointers to memory regions 72 and 76 (for the cache and the system configuration, respectively). During step 44 processor 28 loads second kernel 38 (including permamem module 39) to a memory region 78, and prior to starting (via the kexec function) the second kernel in step 46, processor 28 overwrites first kernel 34 in memory region 64 with second kernel 38.

During step 48, processor 28 loads second storage system application 29 to memory region 68 (or any unused region of volatile memory 31) and starts executing the second storage system application. In step 50, second storage system application 29 establishes addressability to memory regions 72 (i.e., cache 70) and 76 (i.e., system configuration 74). After establishing addressability to the cache and the system configuration, processor 28, executing second storage system application 29 can address and use the cache and the system configuration as they were prior to step 44.

The following are examples of functions permamem modules 35 and 39 can utilize to preserve and tag specific regions in memory 31, as discussed in the flow diagram of FIG. 2.

struct tagmem_region*

(1) tagmem_reg_vmalloc(size_t size, void **ptr_out, int user, const char *fmt, ...)

_attribute_((format (printf, 4, 5)));

During step 42, processor 28, executing permamem module 35, can call tagmem_reg_vmalloc to tag one of tagged regions 36 (i.e., to be preserved while booting second operating system kernel 38). The function tagmem_reg_vmalloc performs a memory allocation for a contiguous virtual memory region, and "tags" the region. Processor 28 calls tagmem_reg_vmalloc with the following parameters:

size. A size of the virtual memory region to allocate.

user. A Boolean value indicating if the allocated memory region is restricted to the kernel space or is in the user space.

*fmt. A name for the tagged memory region.

Tagmem_reg_vmalloc returns the following pointers:

ptr_out. A pointer to the tagged contiguous virtual memory region.

tagmem_region: A pointer to a data structure in volatile memory 31 that stores information describing the tagged contiguous virtual memory region.

(2) tagmem_reg_get_by_name(size_t *size, dma_addr_t *dma_handle, void **ptr_out, const char *fmt, ...)

_attribute_((format (printf, 4, 5)));

During step 50, processor 28, executing permamem module 39, can call tagmem_reg_get_by_name to retrieve a pointer to a tagged DMA region referenced by ptr_out, corresponding to the name of the tagged memory region referenced by *fmt. Output parameters include *size and *dma_handle. After calling tagmem_reg_get_by_name, processor 28, executing second operating system kernel 38 can address the tagged region (i.e., referenced by *fmt) whose contents were previously tagged.

(3) int tagmem_reg_rename(struct tagmem_region *tagmem, const char *fmt, ...)

_attribute_((format (printf, 2, 3)));

Processor 28, executing permamem modules 35 and 39, can call tagmem_reg_rename to rename the tagged memory region described in tagmem to the name referenced by *fmt.

(4) unsigned int tagmem_reg_exists(const char *fmt, ...)

_attribute_((format (printf, 1, 2)));

Processor 28, executing permamem modules 35 and 39, can call tagmem_reg_exists to check if a tagged memory region with the name referenced by *fmt exists.

(5) void tagmem_reg_put(struct tagmem_region *reg);

Processor 28, executing permamem modules 35 and 39, can call tagmem_reg_put to allocate a new descriptor for a tagged memory region referenced by *reg. No memory is allocated.

(6) void tagmem_reg_release(struct tagmem_region *reg);

Processor 28, executing permamem modules 35 and 39, can call tagmem_reg_release to release the tagged memory region descriptor and the tagged memory region referenced by *reg.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus, comprising:
a volatile memory; and
a processor configured to execute a first operating system kernel and tag a region of a volatile memory coupled to the processor, to:
retrieve, following the boot of the second operating system kernel, a set of parameters referencing the tagged region from the volatile memory,
use the tagged region based on the retrieved set of parameters, and
tag the volatile memory region by identifying the set of parameters referencing the tagged region, and storing, to the volatile memory, the set of parameters.

2. The apparatus according to claim 1, wherein the processor is configured to initiate the boot by performing a hot upgrade of a computer appliance.

3. The apparatus according to claim 2, wherein the computer appliance comprises a storage controller.

4. The apparatus according to claim 1, wherein the region of the volatile memory is selected from a group consisting of a cache, a system configuration, a direct memory access region, a transaction state and a region for memory mapping.

5. The apparatus according to claim 1, wherein each of the parameters is selected from a group consisting of a name, a size, a virtual memory address, a physical memory address and a memory type.

6. The apparatus according to claim 1, wherein the set of parameters comprises an entry in a parameter table stored in the volatile memory.

7. The apparatus according to claim 1, wherein the processor is configured to store the first operating system at a first address in the volatile memory, and wherein the processor is further configured to initiate the boot of the second operating system kernel by loading the second kernel to the volatile memory to a second address in the virtual memory, copying the second operating system kernel from the second address to the first address, and starting the second kernel.

8. The apparatus according to claim 1, wherein the processor is configured to initiate the boot of the second operating system kernel by storing the second kernel to a boot partition of a storage device coupled to the processor, and initiating a warm boot of the second operating system kernel from the boot partition.

9. A computer program product, comprising:
a non-transitory computer readable storage medium having computer readable program code embodied therewith, the computer readable program code comprising:
computer readable program code in a first operating system kernel configured to tag a region of a volatile memory coupled to the processor;
computer readable program code configured to initiate a boot of a second operating system kernel while preserving in the volatile memory contents stored therein;
computer readable program code configured to retrieve, following the boot of the second operating system kernel, a set of parameters referencing the tagged region from the volatile memory;
computer readable program code configured to use the tagged region, based on the retrieved set of parameters; and
computer readable code configured to tag the volatile memory region by identifying the set of parameters referencing the tagged region, and storing, to the volatile memory, the set of parameters.

10. The computer program product according to claim 9, wherein the region of the volatile memory is selected from a group consisting of a cache, a system configuration, a direct memory access region, a transaction state and a region for memory mapping.

11. The computer program product according to claim 9, wherein each of the parameters is selected from a group consisting of a name, a size, a virtual memory address, a physical memory address and a memory type.

12. The computer program product according to claim 9, wherein the set of parameters comprises an entry in a parameter table stored in the volatile memory.

13. The computer program product according to claim 9, wherein the computer readable program code is configured to store the first operating system kernel a first address in the volatile memory, and wherein the computer readable program code configured to initiate the boot of the second operating system kernel comprises computer readable program code configured to load the second kernel to the volatile memory to a second address in the virtual memory, to copy the second operating system kernel from the second address to the first address, and to start the second kernel.

14. The computer program product according to claim 9, wherein the computer readable program code is configured to initiate the boot of the second operating system kernel by storing the second kernel to a boot partition of a storage device coupled to the processor, and initiating a warm boot of the second operating system kernel from the boot partition.

* * * * *